(12) United States Patent
Yabe

(10) Patent No.: US 7,852,571 B2
(45) Date of Patent: Dec. 14, 2010

(54) OPTICAL SYSTEM DESIGN METHOD USING REAL NUMBER SURFACE NUMBER

(76) Inventor: Akira Yabe, Schwaighofstr.34, Landsberg am Lech (DE) 86899

( * ) Notice: Subject to any disclaimer, the term of this patent is extended or adjusted under 35 U.S.C. 154(b) by 628 days.

(21) Appl. No.: 11/908,054

(22) PCT Filed: May 13, 2005

(86) PCT No.: PCT/JP2005/008781

§ 371 (c)(1),
(2), (4) Date: Sep. 7, 2007

(87) PCT Pub. No.: WO2006/120750

PCT Pub. Date: Nov. 16, 2006

(65) Prior Publication Data

US 2009/0063109 A1    Mar. 5, 2009

(51) Int. Cl.
*G02B 13/10* (2006.01)
(52) U.S. Cl. ...................................... 359/708
(58) Field of Classification Search ......... 359/708–720; 351/168–172
See application file for complete search history.

(56) References Cited

U.S. PATENT DOCUMENTS 6,366,823 B1 * 4/2002 Shirayanagi ................. 700/97

FOREIGN PATENT DOCUMENTS

| JP | 3-174109 A | 7/1991 |
| JP | 10-104508 A | 4/1998 |
| JP | 2000-105301 A | 4/2000 |

* cited by examiner

*Primary Examiner*—Joseph Martinez
(74) *Attorney, Agent, or Firm*—Altera Law Group, LLC

(57) ABSTRACT

Generally, it is difficult to previously know an adequate position of a special optical surface such as an aspherical surface, a diffraction optical element, or an eccentric surface in an optical system. If a trial of designing an optical system with all the possible surface numbers is made, the number of combinations is very large, and the designing is often impossible. The invention solves such a problem and provides means for automatically and efficiently finding out the most suitable surface number of a special optical surface. According to the invention, the surface number of a special optical surface different from a spherical surface is expanded to a real number value, the constitution of an optical system including a special optical surface having a real number value surface number is defined, the real number value surface number is used as an independent variable for optimizing the optical system, and the best surface number of the special optical surface is determined. If the real number value surface number lies in the range from an integer n to an integer n+1, one method for defining the constitution of an optical system including the special optical surface is inserting one or more virtual optical surfaces between an optical surface n and an optical surface n+1 and setting the virtual optical surfaces as special optical surfaces determined by the characteristic values and the real number value surface numbers of the special optical surfaces and different from a spherical surface.

25 Claims, 7 Drawing Sheets

OPTICAL SYSTEM DESIGN METHOD USING REAL NUMBER SURFACE NUMBER

CROSS-REFERENCE TO RELATED APPLICATION

This application claims the benefit of International Application No. PCT/JP2005/008781, with International Filing Date of May 13, 2005.

BACKGROUND OF THE INVENTION

1. Field of the Invention

The present invention relates to a method of optimizing an optical system which realizes automated design of an optical system.

2. Description of the Related Art

Optical surfaces in an optical system are usually spheres which have their centers on the optical axis. Special surfaces such as aspheres, diffractive optical elements (DOEs), and decentered surfaces are effective for improving the function and the quality of the optical system and reducing the weight, size, and cost. But these special surfaces tend to be more expensive and more sensitive to manufacturing errors than ordinary spheres. Then it is important to use the limited number of special surfaces at the appropriate positions in the optical system.

But in general it is difficult to know the appropriate positions of special surfaces in the optical system a priori. In the actual design, it is common to try a number of combinations of the positions of special surfaces and then to choose the best result from them. If all the possible combinations are to be tried, the cases are usually too many to be tried actually. Considering this problem a new method is proposed here to find the best positions of special surfaces automatically and efficiently.

BRIEF SUMMARY OF THE INVENTION

This method extends the surface number of a special surface to a real number and defines the construction of the optical system with optical surfaces with real number surface numbers. The best surface numbers of special surfaces are determined by including the real number surface numbers as independent variables of the optimization of the optical system.

When the surface number of an optical surface with a real number surface number is an integer n, a procedure is defined to set up the optical surface n as a special surface corresponding to the characteristic values which show the function of the optical surface with a real number surface number.

When the surface number of an optical surface with a real number surface number is an integer n, the reliability of the best surface number given by the optimization is improved by constructing the optical system with the optical surface with a real number surface number so as to coincide with the optical system with the special surface at the surface n defined by the characteristic values of the optical surface with a real number surface number.

The efficiency of the optimization is improved by constructing the optical system with optical surfaces with a real number surface number continuous as for the real number surface numbers.

The efficiency of the optimization is improved by constructing the optical system with optical surfaces with a real number surface number smooth as for the real number surface numbers.

When the real number surface number is between n and n+1, one method to construct the optical system with the optical surfaces with a real number surface number is to set up the optical surfaces n and n+1 as special surfaces corresponding to the real number surface number and the characteristic values of the optical surfaces with a real number surface number.

When the real number surface number is between n and n+1, another method to construct the optical system with the optical surfaces with a real number surface number is to insert one or more imaginary surfaces between the optical surfaces n and n+1 and to set up these imaginary surfaces as special surfaces corresponding to the real number surface number and the characteristic values of the optical surfaces with a real number surface number.

When the real number surface number is between n and n+1, by inserting two imaginary surfaces between the optical surfaces n and n+1, when the surface number of an optical surface with a real number surface number is an integer n, the construction of the optical system with the optical surface with a real number surface number coincides with the optical system with the special surface at the surface n defined by the characteristic values of the optical surface with a real number surface number.

The inserted two imaginary surfaces have the same base sphere and the separation of these imaginary surfaces is 0.

The construction of the imaginary surfaces needs to have the following features. When the imaginary surfaces move between optical surfaces n and n+1, the curvature C of the base sphere changes from the curvature $C_n$ of the optical surface n to the curvature $C_{n+1}$ of the optical surface n+1, the refractive index N between the imaginary surfaces changes from the front-side index $N_n$ of the optical surface n to the rear-side index $N'_{n+1}$ of the optical surface n+1, and the character of the special surface with a real number surface number is transferred from the rear-side imaginary surface to the front-side imaginary surface.

One method of the definition which fulfils the above-mentioned conditions is the following. When the distance between the optical surfaces n and n+1 is d, a+b=1, the distance from the optical surface n to the imaginary surfaces is a·d, and the distance from the imaginary surfaces to the optical surface n+1 is b·d, the curvature C of the base sphere of imaginary surfaces and the refractive index N between the imaginary surfaces are determined as $$C = b \cdot C_n + a \cdot C_{n+1}$$

$$N = b \cdot N_n + a \cdot N'_{n+1}$$

When the refractive index between optical surfaces n and n+1 is denoted as $N'_n$, and x and y are coordinates on a plane perpendicular to the optical axis, the aspheric displacement $z_1(x,y)$ of the front-side imaginary surface and the aspheric displacement $z_2(x,y)$ of the rear-side imaginary surface are determined as when $N > N'_n$, $$z_1(x,y) = a \cdot z(x,y)$$

$$z_2(x,y) = -b \cdot z(x,y)$$

when $N < N'_n$, $$z_1(x,y) = -a \cdot f(x,y)$$

$$z_2(x,y) = b \cdot f(x,y)$$

and the phase difference $p_1(x,y)$ of the front-side imaginary surface and the phase difference $p_2(x,y)$ of the rear-side imaginary surface are determined as $$p_1(x,y)=a\cdot p(x,y)$$

$$p_2(x,y)=b\cdot p(x,y)$$

The coefficient "a", which shows a position of the imaginary surfaces, is a function of the real value surface number. One method to make the position of the imaginary surfaces a smooth function of the real number surface number is to determine the coefficient "a" with a smooth function $a(r)$ which satisfies $$a(0)=0, a(1)=1, a'(0)=0, \text{ and } a'(1)=0,$$

where $a'(r)$ is the differential of $a(r)$.

With the proposed method the surface number of a special surface can be included into the design process as a real value design parameter and the best surface number can be determined by the optimization. Comparing with the conventional procedure, in which some locations of special surfaces in the optical system are tried and the best result among them is chosen, the proposed system can find the best surface number within a much shorter time.

DETAILED DESCRIPTION OF THE INVENTION

Figure 1:
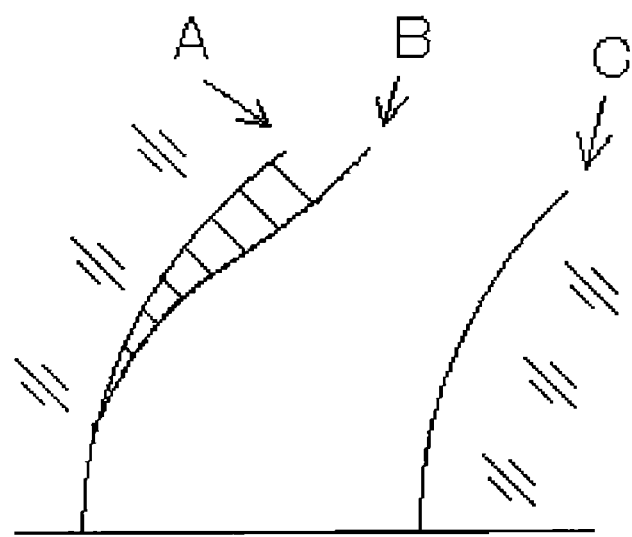
FIG. 1 shows imaginary surfaces in an air space just after a glass space.

At first the terminology is explained. The optical system consists of refractive or reflective surfaces, and the space between two optical surfaces is filled with a homogeneous or inhomogeneous material. If the optical system is axially symmetric, the axis of symmetry is called the optical axis. Even if the optical system is axially non-symmetric, the path of the representative ray can be thought as the optical axis in a broad sense. Optical surfaces are classified to 2 classes. One is spheres which have their centers on the optical axis and the other is special surfaces. Examples of special surfaces are aspheres, diffractive optical elements (DOEs), and decentered surfaces. Aspheres and DOEs are either axially symmetric or axially non-symmetric. Decentered surfaces can be thought as axially non-symmetric aspheres. An optical surface can be both an asphere and a DOE at the same time. Optical surfaces are given surface numbers in the sequence of the ray path.

The surface numbers of special surfaces are integers by nature. This method extends the surface number of a special surface to a real number and defines the construction of the optical system with the optical surfaces with real number surface numbers. There is arbitrariness in this definition as long as the optimization is effective for finding the best surface numbers of special surfaces.

In the following description an optical surface with a real number surface number is called a floating surface. A floating surface has characteristic values which show the function of the surface. One example of the characteristic values is the aspheric displacement $z(x,y)$. Here x and y are coordinates on a plane perpendicular to the optical axis. The function of a DOE is expressed with the phase difference $p(x,y)$.

When the surface number of a floating surface is an integer n, a procedure is defined to set up the optical surface n as a special surface according to the characteristic values of the floating surface. This definition does not always mean that the same characteristic values are given to the optical surface n as the floating surface, but the meaning of the characteristic values of the floating surface is given by this definition. Therefore there is arbitrariness in this definition.

The construction of the optical system with floating surfaces is defined for any real number surface numbers. When the surface number of a floating surface is an integer n, the construction of the optical system with the floating surface should coincide with the optical system with the special surface at the surface n defined by the characteristic values of the floating surface. If this is realized, the best surface number determined by the optimization is more reliable. When the construction of the optical system with floating surfaces is continuous and smooth as for the real number surface numbers, the optimization becomes more efficient.

When the real number surface number is between n and n+1, one method to define the optical system with the floating surface is to set up the optical surfaces n and n+1 as special surfaces defined by the surface number and the characteristic values of the floating surface.

When the real number surface number is between n and n+1, another method to define the optical system with the floating surface is to insert one or more imaginary surfaces between the optical surfaces n and n+1 and to set up these imaginary surfaces as special surfaces defined by the surface number and the characteristic values of the floating surface.

Here the method to insert two imaginary surfaces will be shown. This method enables that, when the surface number of a floating surface is an integer n, the construction of the optical system with the floating surface coincides with the optical system with the special surface at the surface n defined by the characteristic values of the floating surface.

The inserted two imaginary surfaces have the same base sphere and the separation of these imaginary surfaces is 0. When the aspheric displacement $z(x,y)$ of the floating surface is identically 0, the two imaginary surfaces coincide with the base sphere. Then the inserted two imaginary surfaces coincide with each other and the optical system is equivalent to the case without the floating surface.

In cases where the position of the imaginary surfaces coincides with an optical surface in the optical system, the condition for the equivalence to the ordinary asphere, DOE, or decentered surface is considered. The cases are classified to the cases with the imaginary surfaces just after or just before the optical surface and the cases with the imaginary surfaces in an air space or in a glass space. For each case the base sphere of the imaginary surfaces coincides with the optical surface.

In FIG. 1 the imaginary surfaces are in an air space just after a glass space. The surface A is both the rear-side optical surface of the glass space and the front-side imaginary surface. The surface B is the rear-side imaginary surface and the surface C is the rear-side optical surface of the air space. In this case the material between the imaginary surfaces is the material of the glass space, the front-side imaginary surface is the sphere, and the character of the floating surface is given to the rear-side imaginary surface.

Figure 2:
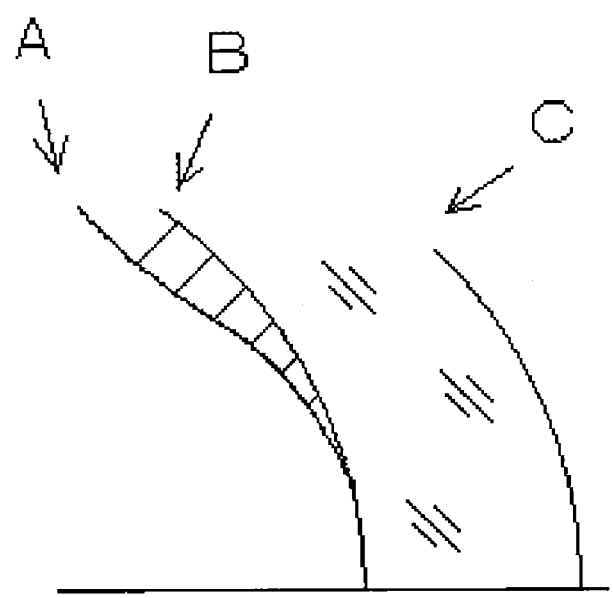
FIG. 2 shows imaginary surfaces in an air space just before a glass space.

In FIG. 2 the imaginary surfaces are in an air space just before a glass space. The surface A is the front-side imaginary surface and the surface B is both the rear-side imaginary surface and the front-side optical surface of the glass space. The surface C is the rear-side optical surface of the glass space. In this case the material between the imaginary surfaces is the material of the glass space, the rear-side imaginary surface is the sphere, and the character of the floating surface is given to the front-side imaginary surface.

Figure 3:
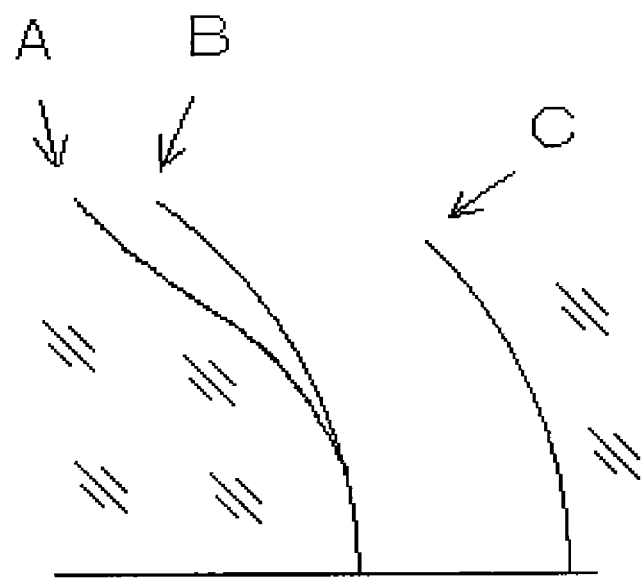
FIG. 3 shows imaginary surfaces in a glass space just before an air space.

In FIG. 3 the imaginary surfaces are in a glass space just before an air space. The surface A is the front-side imaginary surface and the surface B is both the rear-side imaginary surface and the front-side optical surface of the air space. The surface C is the rear-side optical surface of the air space. In this case the material between the imaginary surfaces is air, the rear-side imaginary surface is the sphere, and the character of the floating surface is given to the front-side imaginary surface.

Figure 4:
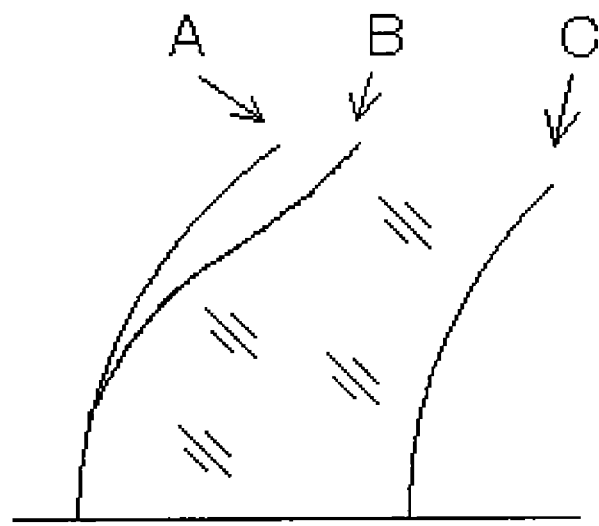
FIG. 4 shows imaginary surfaces in a glass space just after an air space.

In FIG. 4 the imaginary surfaces are in a glass space just after an air space. The surface A is both the front-side optical surface of the glass space and the front-side imaginary surface. The surface B is the rear-side imaginary surface and the surface C is the rear-side optical surface of the glass space. In this case the material between the imaginary surfaces is air, the front-side imaginary surface is the sphere, and the character of the floating surface is given to the rear-side imaginary surface.

When the position of the imaginary surfaces coincides with an optical surface in the optical system, the construction of the imaginary surfaces is summarized as follows. The base sphere of the imaginary surfaces coincides with the optical surface. The material between the imaginary surfaces coincides with the material of the opposite side of the imaginary surfaces over the optical surface. When the imaginary surfaces are just after the optical surface, the character of the floating surface is given to the rear-side imaginary surface. When the imaginary surfaces are just before the optical surface, the character of the floating surface is given to the front-side imaginary surface.

Figure 5:
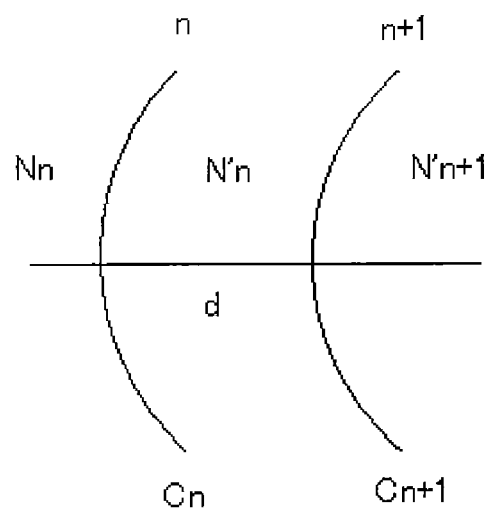
FIG. 5 shows the explanation of the notation.

When the imaginary surfaces move between optical surfaces n and n+1, the construction of the imaginary surfaces changes as follows. In FIG. 5 the necessary notation is explained. The curvature C of the base sphere changes from the curvature $C_n$ of the optical surface n to the curvature $C_{n+1}$ of the optical surface n+1. The refractive index N between the imaginary surfaces changes from the front-side index $N_n$ of the optical surface n to the rear-side index $N'_{n+1}$ of the optical surface n+1. The character of the floating surface is transferred from the rear-side imaginary surface to the front-side imaginary surface.

If the change of the curvature of the base surface of the imaginary surfaces, the refractive index between the imaginary surfaces and the distribution of the character of the floating surface over the imaginary surfaces is a smooth function of the position of the imaginary surfaces, the optimization with the imaginary surfaces becomes efficient. One example of such functions is the linear interpolation, although the possible functions are not restricted to this example. Suppose that the distance between the optical surfaces n and n+1 is d, the distance from the optical surface n to the imaginary surfaces is a·d, and the distance from the imaginary surfaces to the optical surface n is b·d. Here a+b=1. The curvature C of the base sphere of imaginary surfaces and the refractive index N between the imaginary surfaces are determined as follows.

$$C = b \cdot C_n + a \cdot C_{n+1}$$

$$N = b \cdot N_n + a \cdot N'_{n+1}$$

When the refractive index between optical surfaces n and n+1 is denoted as $N'_n$, the aspheric displacement $z_1(x,y)$ of the front-side imaginary surface and the aspheric displacement $z_2(x,y)$ of the rear-side imaginary surface are determined as follows.

When $N > N'_n$, $$z_1(x,y) = a \cdot z(x,y)$$

$$z_2(x,y) = -b \cdot z(x,y)$$

When $N < N'_n$, $$z_1(x,y) = -a \cdot z(x,y)$$

$$z_2(x,y) = b \cdot z(x,y)$$

By this definition, when $N > N'_n$, $$z_1(x,y) - z_2(x,y) = z(x,y)$$

when $N < N'_n$, $$z_1(x,y) - z_2(x,y) = -z(x,y)$$

The phase difference $p_1(x,y)$ of the front-side imaginary surface and the phase difference $p_2(x,y)$ of the rear-side imaginary surface are determined as follows.

$$p_1(x,y) = a \cdot p(x,y)$$

$$p_2(x,y) = b \cdot p(x,y)$$

By this definition, $$p_1(x,y) + p_2(x,y) = p(x,y)$$

Figure 6:
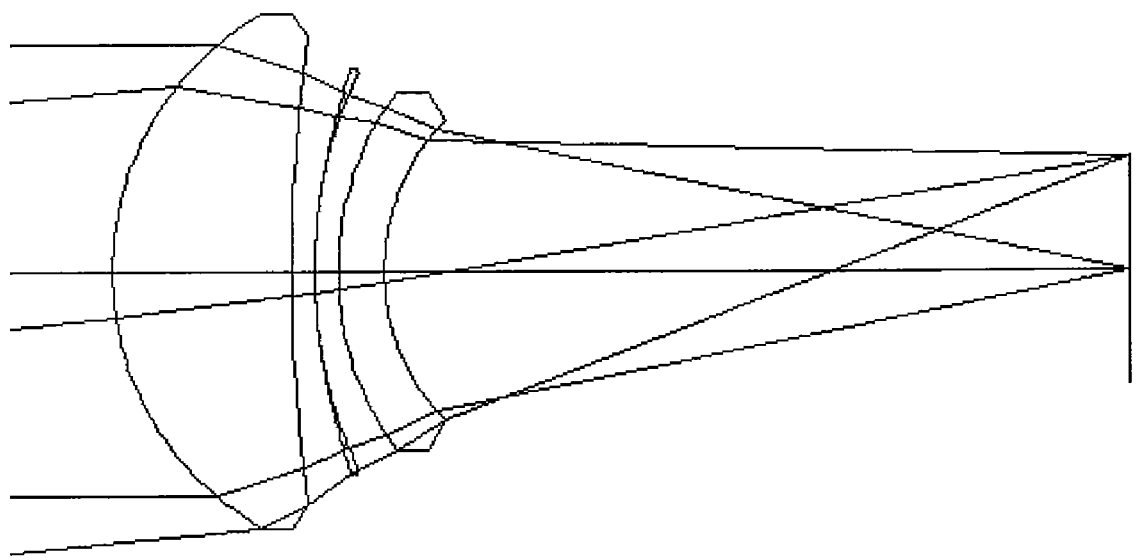
FIG. 6 shows imaginary surfaces at the center of an air space.
Figure 7:
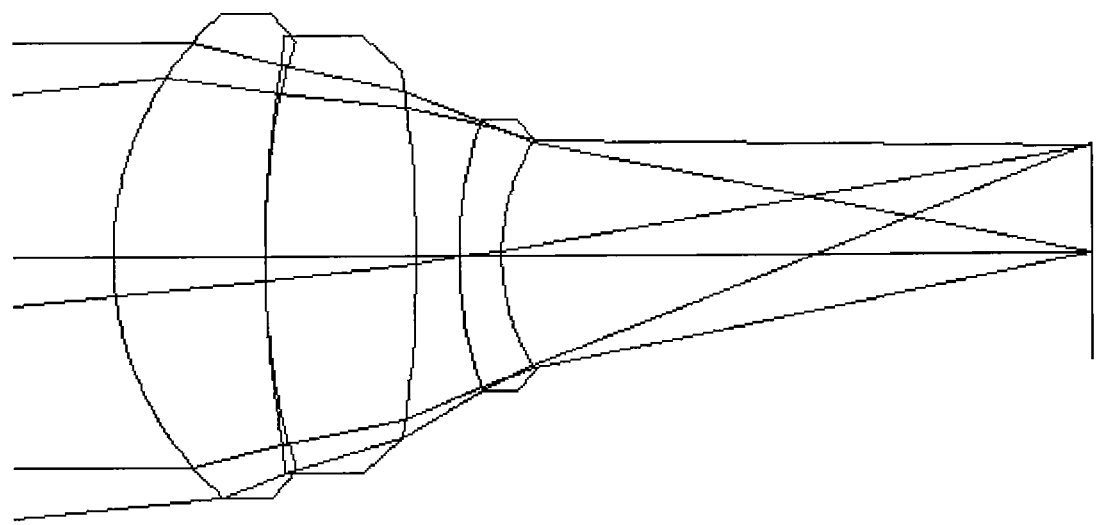
FIG. 7 shows Imaginary surfaces at the center of a glass space.

FIG. 6 is an example of imaginary surfaces at the center of an air space, and FIG. 7 is an example of imaginary surfaces at the center of a glass space.

When a=0 and b=1, the position of the floating surface coincides with the optical surface n and the aspheric displacement becomes:

When $N_n > N'_n$, $$z_2(x,y) = -z(x,y)$$

When $N_n < N'_n$, $$z_2(x,y) = z(x,y)$$

When a=1 and b=0, the position of the floating surface coincides with the optical surface n+1 and the aspheric displacement becomes:

When $N'_{n+1} > N'_n$, $$z_1(x,y) = f(x,y)$$

When $N'_{n+1} < N'_n$, $$z_1(x,y) = -f(x,y)$$

In this way, when the refractive index of the rear-side of the optical surface is smaller than the refractive index of the front-side, the aspheric displacement of the imaginary surface has the opposite sign of the aspheric displacement of the floating surface. The meaning of the aspheric displacement of the floating surface is given by this relation.

Figure 8:
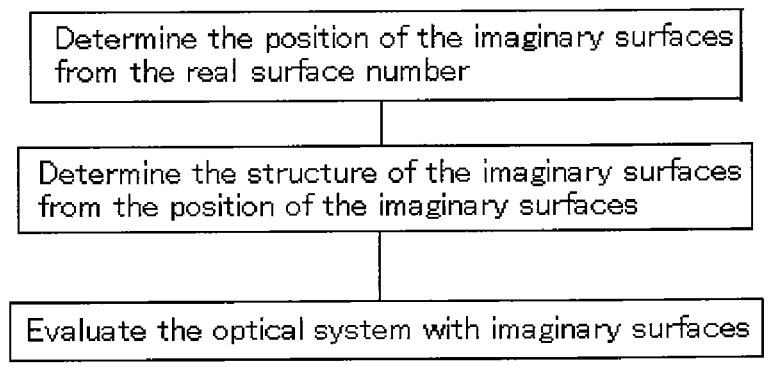
FIG. 8 shows the summary of the procedure.

The coefficient "a" which shows the position of the imaginary surfaces is a function of the real number surface number. When the real number surface number is an integer n, the position of imaginary surfaces coincides with the optical surface n and the surface is equivalent to the ordinary asphere, DOE, or decentered surface. In order that the construction of the optical system with a floating surface is continuous to the real number surface number, the coefficient "a" need to be a continuous function of the fraction r of the real number surface number such that, $a(0)=0$ $a(1)=1$ The simplest among these functions is, $a(r)=r$ But with this function the position of imaginary surfaces is not a smooth function of the real number surface number at integer numbers, because the surface separations before and after optical surfaces are not generally equal. For keeping the efficient optimization, the aberrations of the optical system should be smooth functions of design parameters. One method to eliminate this defect is to use a smooth function such that, $a'(0)=0$ $a'(1)=0$ where a'(r) is the differential of a(r). Then the position of imaginary surfaces is always a smooth function of the real number surface number. Examples of these functions are, $a(r)=(1-\cos(pi \cdot r))/2$ $a(r)=2r^2-r^4$ In FIG. 8 the procedure is summarized. The position of the imaginary surfaces is determined from the real number surface number. The structure of the imaginary surfaces is determined from the position of the imaginary surfaces. Then the optical system with the imaginary surfaces is evaluated. The best real number surface number is determined as a result of the optimization by adding the real number surface number and characteristic values of the floating surface to the independent variables. The determined surface number is not an integer but a real number in general. Then the optical system needs to be optimized after the surface number is fixed to the nearest integer.

More than one floating surfaces can be included in an optical system. In this case it is necessary to avoid more than one floating surfaces to stay between optical surfaces n and n+1. This can be controlled in the optimization with the constraints on the real number surface numbers.

EXPERIMENTAL EXAMPLE 1

Figure 9:
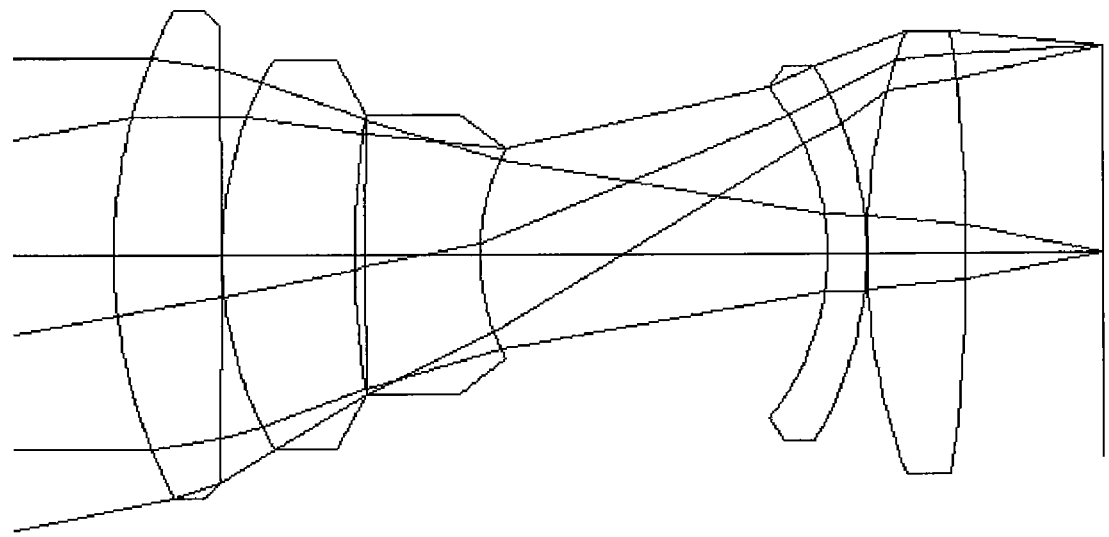
FIG. 9 shows the starting lens for the examples.

FIG. 9 shows the starting lens for the following examples. For this lens FNO is 2.5, the focal length is 50 mm, and the field angle is 11.3 deg. The global optimization is used in the following examples. The purpose of the optimization is to find the minimum point of the merit function. The local optimizer finds a local minimum near the starting point. The global optimizer finds many local minima in a wide region over the nearest local minimum. Then the solution that has the minimum merit function value is chosen from these solutions.

Figure 10:
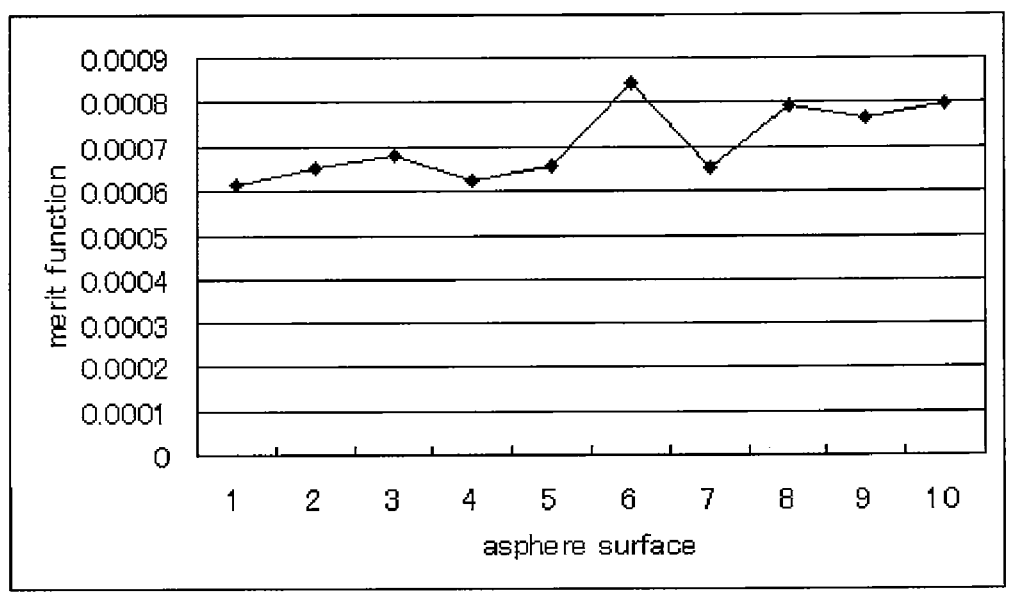
FIG. 10 shows the relation between the surface number of the asphere and the merit function value.
Figure 11:
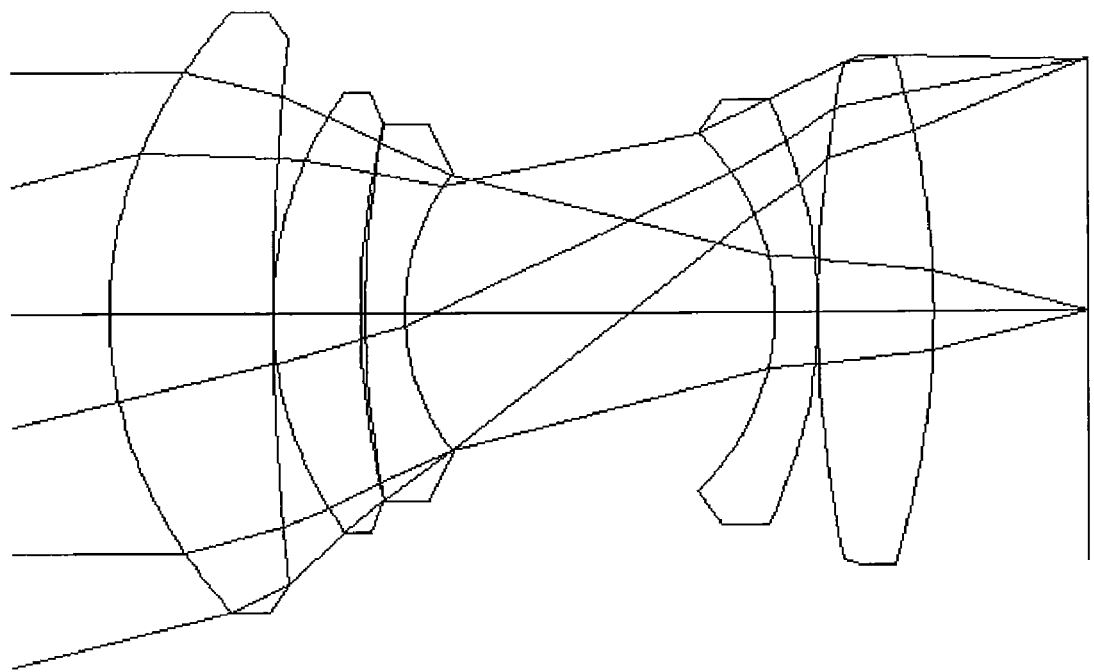
FIG. 11 shows the best solution with the asphere at the surface 1.

In example 1 the lens of FNO=2.0, the focal length=50 mm, and the field angle=14.0 deg is designed by using 1 asphere. For seeing the effect of the asphere, lenses with an asphere at each of 10 surfaces were designed. 20 solutions were found with the global optimization and the solution with the minimum merit function value was chosen. FIG. 10 shows the relation between the surface number of the asphere and the merit function value of the best solution. FIG. 11 shows the best solution with the asphere at the surface 1. The merit function of this solution is 0.000616.

Figure 12:
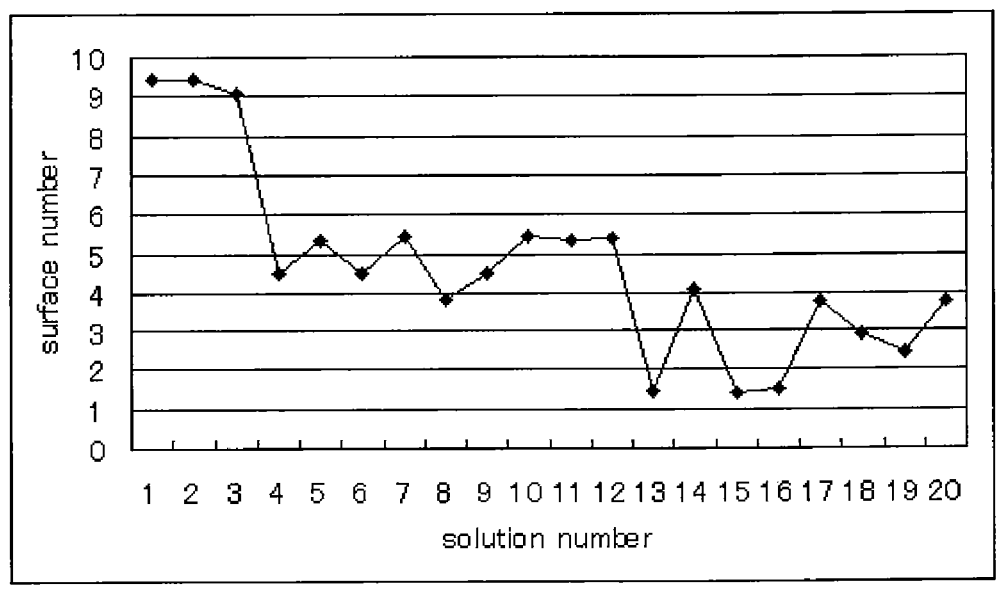
FIG. 12 shows the real number surface number for each solution of the global optimization.

As the design with the real number surface number, the initial value 10 was chosen for the real number surface number and 20 solutions were found with the global optimization. FIG. 12 shows the real number surface number for each solution of the global optimization. Then the solutions were optimized after the surface number was fixed to the nearest integers. The best solution has the asphere at the surface 4 and the merit function value is 0.000621. Although the initial value of the real number surface number is 10, the good solution with the asphere at the surface 4 was found automatically.

EXPERIMENTAL EXAMPLE 2

Figure 13:
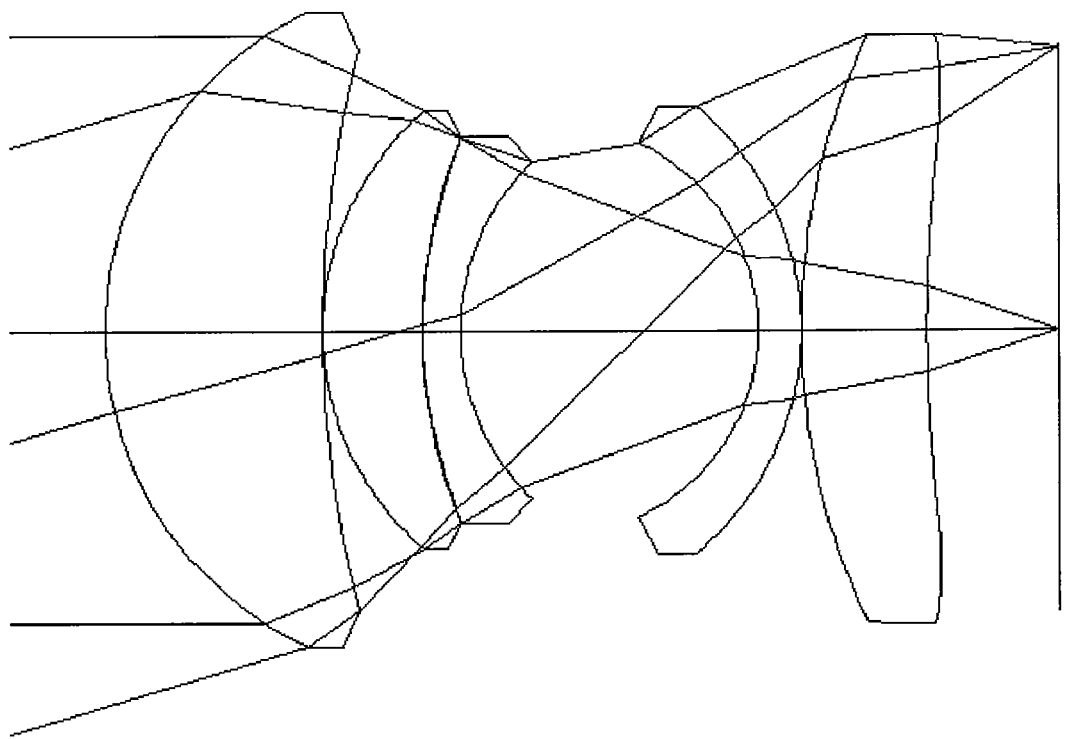
FIG. 13 shows the best solution with the aspheres at the surfaces 3, 5, 10.

In example 2 the lens of FNO=1.6, the focal length=50 mm, and the field angle=16.7 deg is designed by using 3 aspheres. In the case of 3 aspheres the combination of asphere surface numbers is 120 and it is not practical to try all the combinations. As the design with the real number surface numbers, the initial values 1, 5, 9 were chosen for the real number surface numbers and the best solution has the aspheres at the surfaces 3, 5, 10 and the merit function value is 0.000910. FIG. 13 shows this solution. The merit function of the best solution with aspheres at surfaces 1, 5, 9 is 0.001261. By the design with the real number surface numbers, the better combination of asphere surface numbers was found automatically.

EXPERIMENTAL EXAMPLE 3

Figure 14:
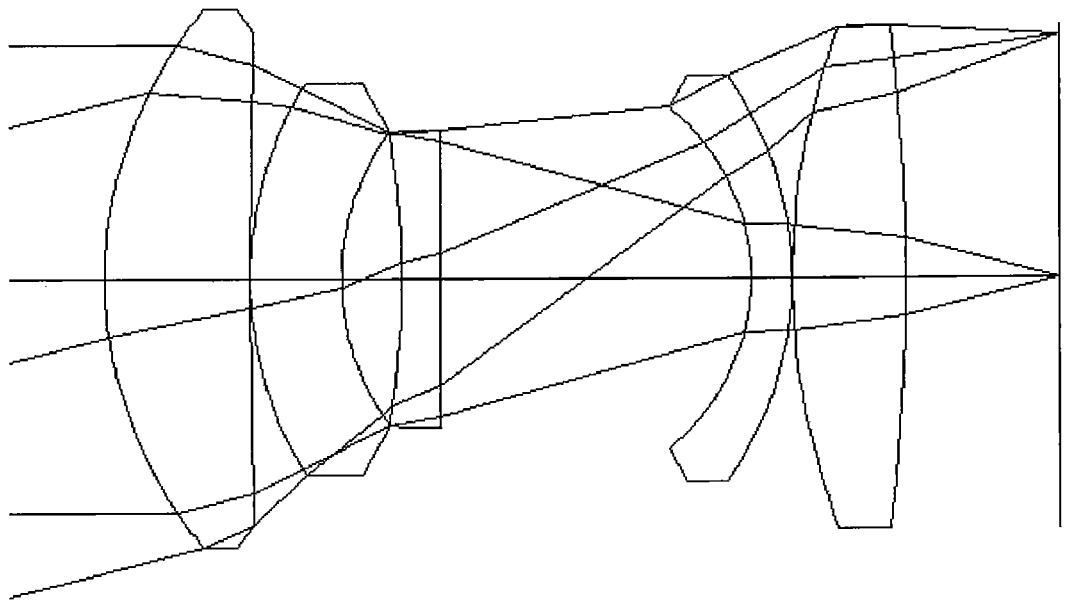
FIG. 14 shows the best solution with the asphere with DOE at the surface 1.

In example 3 the lens of FNO=2.0, the focal length=50 mm, and the field angle=14.0 deg is designed by using 1 asphere with DOE. The initial value 10 was chosen for the real number surface number and 20 solutions were found with the global optimization. The best solution has the asphere at the surface 1 and the merit function value is 0.000476. FIG. 14 shows this solution. It was shown that this method is also effective for the design with the aspheres with DOE.

What is claimed is:

1. A method of optimizing an optical system, comprising the steps of:
   extending the surface number of a special surface, which is different from a sphere, to a real number,
   defining the construction of the optical system with real number surface numbers of special surfaces, and
   determining the best surface numbers of special surfaces by including the real number surface numbers as independent variables of the optimization of the optical system.

2. A method of optimizing an optical system according to claim 1, further comprising the feature such that:
   when the surface number of an optical surface with a real number surface number is an integer n, a procedure is defined to set up the optical surface n as a special surface corresponding to the characteristic values which show the function of the optical surface with a real number surface number.

3. A method of optimizing an optical system according to claim 2, further comprising the feature such that:
when the surface number of an optical surface with a real number surface number is an integer n, the optical system with the optical surface with a real number surface number is constructed so as to coincide with the optical system with the special surface at the surface n defined by the characteristic values of the optical surface with a real number surface number.

4. A method of optimizing an optical system according to claim 2, further comprising the feature such that:
the optical system with optical surfaces with a real number surface number is constructed continuous as for the real number surface numbers.

5. A method of optimizing an optical system according to claim 2, further comprising the feature such that:
the optical system with optical surfaces with a real number surface number is constructed smooth as for the real number surface numbers.

6. A method of optimizing an optical system according to claim 2, further comprising the feature such that:
when the real number surface number is between n and n+1, the optical system with the optical surfaces with a real number surface number is constructed by setting up the optical surfaces n and n+1 as special surfaces corresponding to the real number surface number and the characteristic values of the optical surfaces with a real number surface number.

7. A method of optimizing an optical system according to claim 2, further comprising the feature such that:
when the real number surface number is between n and n+1, the optical system with the optical surfaces with a real number surface number is constructed by inserting one or more imaginary surfaces between the optical surfaces n and n+1 and by setting up these imaginary surfaces as special surfaces corresponding to the real number surface number and the characteristic values of the optical surfaces with a real number surface number.

8. A method of optimizing an optical system according to claim 7, further comprising the feature such that:
when the real number surface number is between n and n+1, the optical system with the optical surfaces with a real number surface number is constructed by inserting two imaginary surfaces between the optical surfaces n and n+1.

9. A method of optimizing an optical system according to claim 8, further comprising the feature such that:
the inserted two imaginary surfaces have the same base sphere and the separation of these imaginary surfaces is 0.

10. A method of optimizing an optical system according to claim 9, further comprising the feature such that:
when the imaginary surfaces move between optical surfaces n and n+1, the curvature C of the base sphere changes from the curvature $C_n$ of the optical surface n to the curvature $C_{n+1}$ of the optical surface n+1, the refractive index N between the imaginary surfaces changes from the front-side index $N_n$ of the optical surface n to the rear-side index $N'_{n+1}$ of the optical surface n+1, and the character of the special surface with a real number surface number is transferred from the rear-side imaginary surface to the front-side imaginary surface.

11. A method of optimizing an optical system according to claim 10, further comprising the feature such that:
when the distance between the optical surfaces n and n+1 is d, a+b=1, the distance from the optical surface n to the imaginary surfaces is a·d, and the distance from the imaginary surfaces to the optical surface n+1 is b·d, the curvature C of the base sphere of imaginary surfaces and the refractive index N between the imaginary surfaces are determined as $C = b \cdot C_n + a \cdot C_{n+1}$ $N = b \cdot N_n + a \cdot N'_{n+1}$ when the refractive index between optical surfaces n and n+1 is denoted as $N'_n$, and x and y are coordinates on a plane perpendicular to the optical axis, the aspheric displacement $z_1(x,y)$ of the front-side imaginary surface and the aspheric displacement $z_2(x,y)$ of the rear-side imaginary surface are determined as
when $N > N'_n$, $z_1(x,y) = a \cdot z(x,y)$ $z_2(x,y) = -b \cdot z(x,y)$ when $N < N'_n$, $z_1(x,y) = -a \cdot f(x,y)$ $z_2(x,y) = b \cdot f(x,y)$ and
the phase difference $p_1(x,y)$ of the front-side imaginary surface and the phase difference $p_2(x,y)$ of the rear-side imaginary surface are determined as $p_1(x,y) = a \cdot p(x,y)$ $p_2(x,y) = b \cdot p(x,y)$.

12. A method of optimizing an optical system according to claim 9, further comprising the feature such that:
when the distance between the optical surfaces n and n+1 is d and the fraction of the real number surface number is r, the distance from the optical surface n to the imaginary surfaces is determined as a(r)·d with a smooth function a(r) which satisfies $a(0)=0, a(1)=1, a'(0)=0,$ and $a'(1)=0,$ where a'(r) is the differential of a(r).

13. A method of optimizing an optical system having at least first and second optical surfaces, comprising:
inserting a special surface at an arbitrary position between the first and second optical surfaces, the special surface having at least one special characteristic and at least one characteristic value;
associating a real number surface number with the special surface, the real number surface number relating to the position between the first and second optical surfaces;
forming a first plurality of independent variables, the first plurality including at least the real number surface number and the at least one characteristic value;
forming a merit function from at least the first plurality of independent variables; and
optimizing the merit function to form a first optimized merit function and a first plurality of optimized independent variables.

14. The method of claim 13, wherein:
the at least one special characteristic is an asphere; and
the at least one characteristic value includes at least one aspheric coefficient.

15. The method of claim 13, wherein:
the at least one special characteristic is an diffractive optical element; and
the at least one characteristic value includes at least one phase difference.

16. The method of claim 13, wherein:
the at least one special characteristic is a decentered surface; and
the at least one characteristic value includes at least one displacement.

17. The method of claim 13, further comprising:
determining an optimized special surface having an optimized real number surface number and an optimized at least one characteristic value from the first plurality of optimized independent variables;
determining an optimized position of the optimized special surface between the first and second optical surfaces from the optimized real surface number;
determining a near surface to be the closer of the first and second optical surfaces to the optimized special surface;
assigning the special characteristic and at least one unoptimized characteristic value to the near surface;
forming a second plurality of independent variables, the second plurality including the at least one unoptimized characteristic value;
forming a second merit function from at least the second plurality of independent variables; and
optimizing the second merit function to form a second optimized merit function and a second plurality of optimized independent variables.

18. The method of claim 13, wherein:
the special surface comprises a first and a second imaginary surface both disposed at the special surface with a separation of 0;
the first and second imaginary surfaces have first and second curvatures, respectively, which are equal to each other; and
the first and second imaginary surfaces both have the at least one special characteristic of the special surface.

19. The method of claim 18, wherein:
the first plurality of independent variables further includes a special surface position;
during the optimizing step, the special surface position is optimized and describes at least one intermediate location between the first and second optical surfaces; and
as the at least one intermediate location varies from the first to the second optical surface:
the curvatures of both the first and second imaginary surfaces vary from a curvature of the first optical surface to a curvature of the second optical surface; and
a refractive index between the first and second imaginary surfaces varies from a refractive index adjacent to the first optical surface and facing away from the second optical surface to a refractive index adjacent to the second optical surface and facing away from the first optical surface.

20. The method of claim 19, wherein the special surface position is a smooth function of the real number surface number.

21. The method of claim 20, wherein the real number surface number equals an integer when the special surface position coincides with the first or second optical surfaces.

22. The method of claim 21, wherein the first derivative of the special surface position with respect to the real number surface number equals 0 when the special surface position coincides with the first or second optical surfaces.

23. The method of claim 20, wherein:
the real number surface number equals a first integer when the special surface position coincides with the first optical surface;
the real number surface number equals a second integer when the special surface position coincides with the second optical surface; and
the second integer equals the first integer plus 1.

24. A method of optimizing an optical system having at least a first optical surface and a second optical surface, comprising:
inserting a floating surface between the first and the second optical surfaces, the floating surface comprising a first imaginary surface and a second imaginary surface separated from the first imaginary surface by zero;
forming a plurality of independent variables, the plurality including at least a position of the floating surface;
forming a merit function that includes at least the plurality of independent variables; and
optimizing the merit function, so that during the optimization the floating surface has a location described by at least one intermediate location between the first and second optical surfaces;
wherein:
a quantity a is defined as varying from 0 to 1 and describing the at least one intermediate location, with (a=0) describing the first optical surface and (a=1) describing the second optical surface;
a quantity $C_n$ is defined as a curvature of the first optical surface;
a quantity $C_{n+1}$ is defined as a curvature of the second optical surface;
a curvature C of both the first and second imaginary surfaces is given by a quantity $((1-a) \cdot C_n)+(a \cdot C_{n+1})$;
a quantity $N_n$ is defined as a refractive index adjacent to the first optical surface and facing away from the second optical surface;
a quantity $N'_{n+1}$ is defined as a refractive index adjacent to the second optical surface and facing away from the first optical surface;
a refractive index N between the first and second imaginary surfaces is given by a quantity $((1-a) \cdot N_n)+(a \cdot N'_{n+1})$;
a quantity $N'_n$ is defined as a refractive index between the first and second optical surfaces;
a quantity z(x,y) is defined as an aspheric displacement of the floating surface;
an aspheric displacement $z_1(x,y)$ of the first imaginary surface is given by a quantity $(-a \cdot z(x,y))$ if $(N<N'_n)$ or by a quantity $(a \cdot z(x,y))$ if $(N>N'_n)$;
an aspheric displacement $z_2(x,y)$ of the second imaginary surface is given by a quantity $((1-a) \cdot z(x,y))$ if $(N<N'_n)$ or by a quantity $(-(1-a) \cdot z(x,y))$ if $(N>N'_n)$;
a quantity p(x,y) is defined as a phase difference of the floating surface;
a phase difference $p_1(x,y)$ of the first imaginary surface is given by a quantity $(a \cdot p(x,y))$; and
a phase difference $p_2(x,y)$ of the second imaginary surface is given by a quantity $((1-a) \cdot p(x,y))$.

25. The method of claim 24, wherein the quantity a varies linearly with the separation between the first optical surface and the first imaginary surface.

* * * * *